June 26, 1973 T. J. KNIFF Re. 27,686
PICK TYPE MINING BIT AND SUPPORT BLOCK THEREFOR
Original Filed May 4, 1970
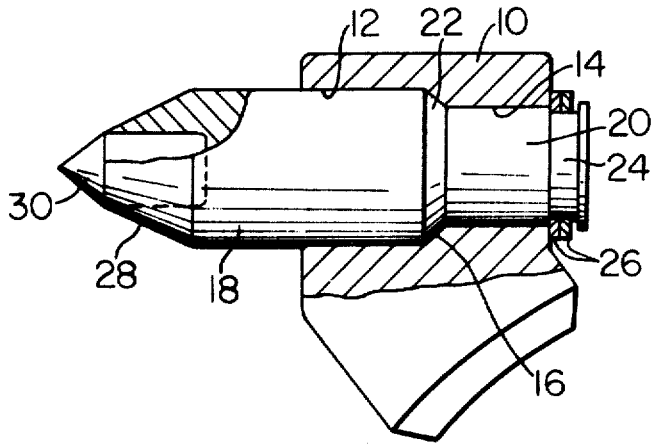
INVENTOR
THOMAS J. KNIFF
BY William A. Cosby United States Patent Office Re. 27,686
Reissued June 26, 1973

27,686
PICK TYPE MINING BIT AND SUPPORT BLOCK THEREFOR

Thomas J. Kniff, Bedford, Pa., assignor to Kennametal Inc., Latrobe, Pa.

Original No. 3,650,565, dated Mar. 21, 1972, Ser. No. 34,249, May 4, 1970. Application for reissue July 28, 1972, Ser. No. 276,234
Int. Cl. E21c *35/18*
U.S. Cl. 299—86 10 Claims

Matter enclosed in heavy brackets [ ] appears in the original patent but forms no part of this reissue specification; matter printed in italics indicates the additions made by reissue.

ABSTRACT OF THE DISCLOSURE

The specification discloses a heavy duty pick type mining bit and a support block therefor in which the block has a bore completely therethrough with a shoulder intermediate the ends of the bore and the pick type tool or bit is shaped to conform to the bore in the block and to take a seat on the shoulder therein and is retained in the block by retaining rings on the small end of the pick outside the block.

This invention relates to pick-type mining tools, or bits, and in particular to a novel pick-type mining tool and a support block therefor.

*The present application is an application for reissue of U.S. Pat. 3,650,565, issued Mar. 21, 1972.*

In U.S. Pat. No. 3,499,685, assigned to the same assignee as the present application, there is shown a pick-type mining tool, or bit, in which a hard wear resistant sleeve is interposed between a support block and a pick, with both the pick and sleeve being adapted for rotation. The arrangement of the patent has the merit of maintaining the pick sharp throughout its life because the pick rotates and the wear is distributed circumferentially thereof thereby causing the point end of the pick to wear down substantially uniformly in the circumferential direction rather than becoming flat on one side.

The hard wear resistant block, on the other hand, prevents the block from wearing away rapidly because the wear due to rotation of the pick is distributed between the pick and the block while, furthermore, the sleeve is supported in the block against lateral deflection therein and thus forms a good seat in the block which takes substantially all of the wear. By the provision of the hard wear resistant sleeve in the block, the block can be made to last throughout the life of several picks and it will not need replacement before the machine on which the block is mounted must be shut down for a general overhaul.

While the arrangement with the rotating sleeve has considerable merit, there are instances when the machine having the structure of the aforementioned patent mounted thereon will encounter hard formations which impose rather more load on the pick that is desirable and which can lead to breaking or damaging of the pick. Under such circumstances, it is desirable to employ a heavier pick and the present invention is particularly concerned with the provision of a specially constructed pick which can be inserted in a block of the nature referred to after the rotating sleeve has been removed from the block.

The pick is especially configured to fit rotatably in the block while taking a bearing on the block and engaging the seat in the block provided for the aforementioned rotating sleeve. By replacing the rotating sleeve in such a block with a pick having the same external configuration as the block, an extremely strong pick can be presented to a formation to be worked and will be firmly and solidily supported in the block against bending or deflection under even extreme working loads.

When a hard formation has been removed by use of the heavy pick, the heavy pick can readily be removed from the block and the smaller pick and rotary sleeve can be replaced in the block.

The exact nature of the present invention will become more apparent upon reference to the accompanying drawing and the following detailed specification.

Referring to the drawing somewhat more in detail, reference numeral 10 indicates a support block adapted for being mounted on a mining machine such as by welding. The block can be mounted on a rotating wheel or drum or can be affixed to a moving chain or to the face of a rotating disc or in any other manner so that a pick-type tool carried in the block will be presented point end foremost to the work and, preferably, at an angle to the axis of the pick-type bit so that the bit will be caused to rotate as it is driven through the formation.

Block [pick-type] *10 has* a bore extending completely therethrough and comprising a larger diameter portion 12 and a smaller diameter portion 14, coaxial with portion 12, and with a tapered seat 16 interconnecting the larger and smaller diameter portions of the bore. Seat 16 tapers inwardly toward the smaller diameter portion of the bore.

A pick-type tool, or bit, is provided for use with the tool and comprises a member symmetrical about a longitudinal axis and having a larger diameter cylindrical portion 18 rotatably fitting larger diameter bore portion 12 and a smaller diameter cylindrical portion 20 rotatably fitting smaller diameter bore portion 14. A tapered region 22 interconnects the larger and smaller diameter portions of the bit and is complementary in angle to seat 16 and engages seat 16.

The smaller diameter portion 20 of the bit extends out the back end of the block and is provided with an annular groove 24 for receiving retaining means such as the rings 26 which fit in the groove and which are larger in diameter than the smaller diameter of portion 14 of the bore in the block. The retaining rings hold the pick in the bore in the block but do not prevent rotation of the bit in the block.

The larger diameter portion 18 of the bit also extends outwardly from the block and terminates in a conical end part 28 having a hard wear resistant insert 30, such as cemented tungsten carbide, mounted therein and formed to a point. The axial length of the larger diameter portion of the bit from the base of the conical end part to the adjacent face of the block is preferably not less than the length of the larger diameter portion of the bit which is disposed in the block, and may be substantially longer.

Due to the firm lateral support provided for the pick by the block, substantial lengths of overhang can be permitted for the point end of the pick. Further, due to the disposition of the seat in the block and on the bit so that substantial axial lengths of the pick on both sides of the seat are journaled in the block, the arrangement is extremely strong and wear resistant with most of the wear taking place where the seat portions of the bit and block engage each other.

By providing the retaining means 26 outside the block, the block can be relatively simply formed by simple boring techniques while, furthermore, none of the bearing [are] which the block can provide for the bit is diminished by a groove or recess for the retaining means.

Modifications may be made within the scope of the appended claims.

I claim:

1. In combination; a support block having a bore extending completely therethrough, said bore having a larger diameter portion at one end and a smaller diameter portion at the other end in end to end concentric relation and a shoulder joining said portions, said shoulder being located in about the middle of the length of said bore, a pick-type bit mounted in said bore and freely rotatable therein, said bit having a shoulder engaging the shoulder in the bore and having concentric larger and smaller diameter portions on opposite sides of said shoulder extending along the said larger and smaller diameter portions respectively of said bore, said larger and smaller diameter portions of said bit fitting said bore portions with slight clearance so as not to inhibit free rotation of said bit in said bore, said larger and smaller diameter portions of said bit projecting from respective ends of said block, retaining means engaging the smaller diameter portion of said bit outside said block and larger than said smaller diameter portion of said bore to retain the bit in the block while not interfering with free rotation of the bit in the block, the said larger diameter portion of said bit having a conical end portion formed thereon concentric with the axis of said bit, said larger diameter portion of said bit being of uniform diameter from the said shoulder thereon to said conical end portion thereto.

2. A combination according to claim 1 which includes a hard wear resistant insert fixed in said bit on the axis thereof in the said conical end portion of said larger diameter portion and forming at least the point region of said conical end portion.

3. A combination according to claim 1 in which said shoulder in said bore and on the said bit are tapered shoulders, and both shoulders being tapered in the same direction and at the same angle.

4. A combination according to claim 3 in which said shoulders taper inwardly toward the smaller portion of said bore in said block.

5. A combination according to claim 1 in which the said shoulder in said bore is in about the middle of the length thereof, the length of the smaller diameter portion of said bit which is confined within the smaller diameter portion of the bore in the block on one side of said shoulder being not greater than the length of the larger diameter portion of said bit which is confined within the larger diameter portion of said bore on the other side of said shoulder.

6. A combination according to claim 5 in which the length of the larger diameter portion of said bit between the larger end of the conical end portion thereof and the adjacent end of said block is at least as long as the larger diameter portion of said bit which is confined within the larger diameter portion of said bore.

7. A combination according to claim 1 in which said smaller diameter portion of said bit is annularly grooved in the region thereof which protrudes from the block, and said retaining means comprises split ring means mounted in the said groove.

*8. In combination; a support block having a bore extending completely therethrough, said bore having a larger diameter portion at one end and a smaller diameter portion at the other end in end to end concentric relation and a shoulder joining said portions, said shoulder being located in about the middle of the length of said bore, a pick-type bit mounted in said bore and freely rotatable therein, said bit having a shoulder engaging the shoulder in the bore and having concentric larger and smaller diameter portions on opposite sides of said shoulder extending along the said larger and smaller diameter portions respectively of said bore, said larger and smaller diameter portions of said bit fitting said bore portions with slight clearance so as not to inhibit free tion of said bit projecting from the respective diameter portion of said bith projecting from the respective end of said block, the said larger diameter portion of said bit having a conical end portion formed thereon concentric with the axis of said bit, said larger diameter portion of said bit being of uniform diameter from the said shoulder thereon to said conical end portion thereof, and retaining means carried by at least one of said block and bit near the free end of said smaller diameter portion of said bit and engageable with the other thereof in response to movement of said block and bit relatively in a direction to cause separation of said shoulders, said retaining means permitting free rotation of said bit in said block.*

*9. A pick type mining tool for use with a support block which has an axial bore with a larger diameter forward part and a smaller diameter rearward part, said parts of said bore being coaxial and of about equal lengths, and a forwardly facing shoulder at the juncture of said parts, said bit being circular in cross section at all points therealong and having a conical forward end terminating in a point, said bit having a larger diameter forward portion adapted to fit loosely in said larger diameter forward part of said bore and a smaller diameter rearward portion adapted to fit loosely in said smaller diameter part of said bore and a rearwardly facing shoulder at the juncture of said portions adapted to engage the shoulder in said bore, the length of said smaller diameter portion of said bit inside said bore and the length of said larger diameter portion of said bit inside said bore being about equal to each other and also being about equal to the length of said larger diameted portion which extends from the base of said conical forward end of said bit to the adjacent end of said larger diameter part of said bore.*

*10. A mining tool support block adapted for use with a pick-type bit which is symmetrical about a longitudinal axis, said bit having a pointed front end and a larger diameter forward end portion and a smaller diameter rearward end portion and a rearwardly facing shoulder at the juncture of said portion, said block comprising a body of metal having forward and rearward faces and a bottom face, said body having an axial bore extending therethrough and penetrating said forward and rearward faces, said bore comprising a forward part adjacent of uniform diameter extending into said block from said forward face adapted loosely to receive the larger diameter portion of said bit and a rearward part also of uniform diameter extending into said block from said rearward face coaxial with said forward part and adapted loosely to receive the smaller diameter portion of said bit, and a forwardly facing shoulder formed at the juncture of said parts of said bore tapering inwardly toward the rear and adapted to engage the said shoulder on said bit, the said shoulder in said bore being disposed about midway between said forward and rearward faces of said body whereby a substantial mass of the metal of said block is disposed rearwardly of said shoulder, said shoulder forming the sole means on said block for sustaining axial thrusts imposed on a bit mounted in the block when the bit is driven against a formation being worked.*

References Cited

The following references, cited by the Examiner, are of record in the patented file of this patent or the original patent.

UNITED STATES PATENTS

| | | | |
|---|---|---|---|
| 3,331,637 | 7/1967 | Krekeler | 299—92 |
| 3,397,012 | 8/1968 | Krekeler | 299—86 |

FOREIGN PATENTS

| | | | |
|---|---|---|---|
| 1,036,535 | 7/1966 | Great Britain | 299—86 |

ERNEST R. PURSER, Primary Examiner

U.S. Cl. X.R.

175—354

UNITED STATES PATENT OFFICE

CERTIFICATE OF CORRECTION

Patent No. Re. 27,686 Dated June 26, 1973

Inventor(s) Thomas J. Kniff

It is certified that error appears in the above-identified patent and that said Letters Patent are hereby corrected as shown below:

Column 3, line 26, replace "thereto" by ---thereof---.

Column 4, line 36, replace "portion" by ---portions---.

Column 4, line 41, strike out "adjacent".

Signed and sealed this 18th day of December 1973.

(SEAL)
Attest:

EDWARD M.FLETCHER,JR.
Attesting Officer

RENE D. TEGTMEYER
Acting Commissioner of Patents